UNITED STATES PATENT OFFICE.

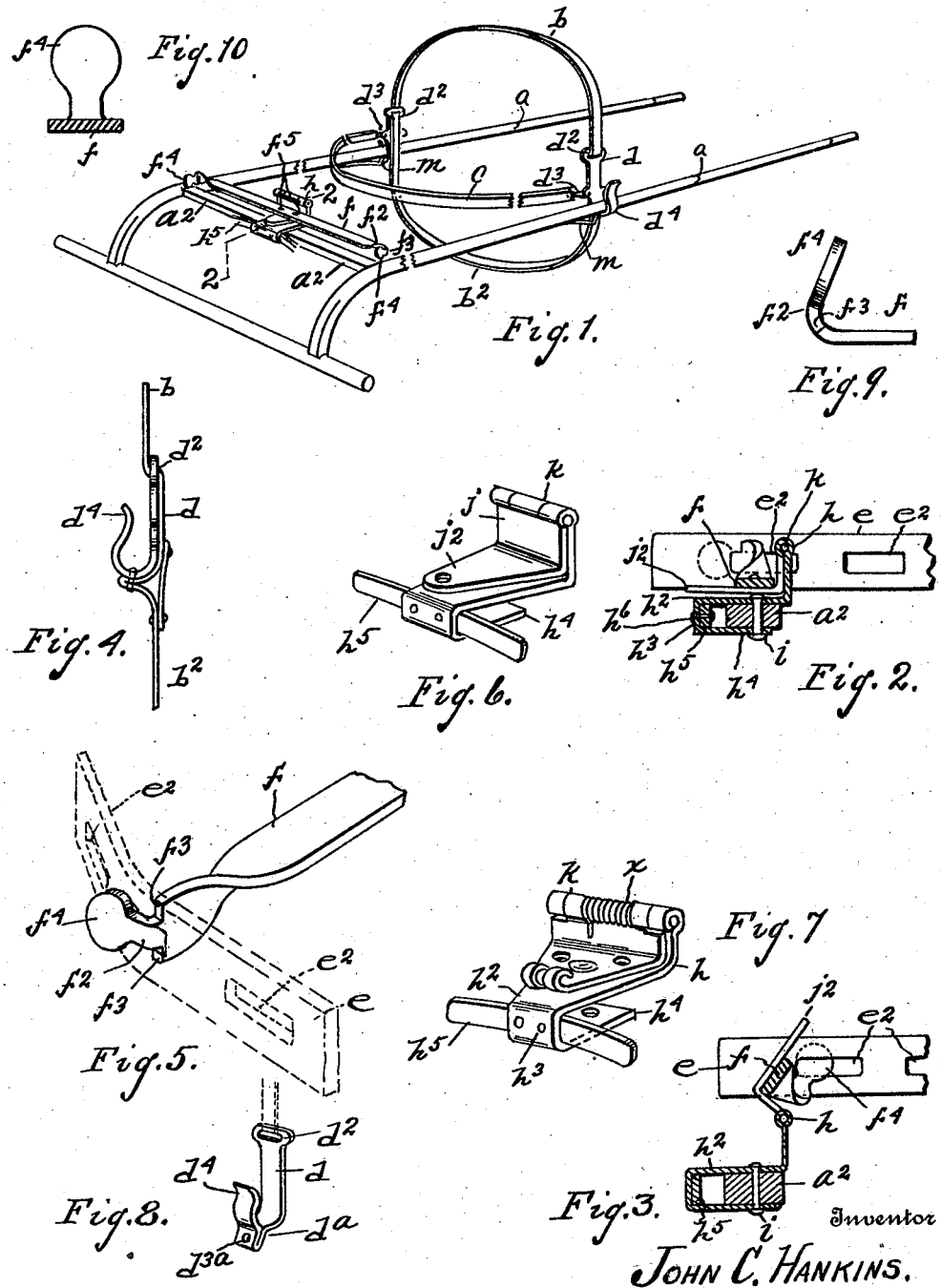

JOHN C. HANKINS, OF DETROIT, MICHIGAN.

HARNESS.

1,401,600. Specification of Letters Patent. Patented Dec. 27, 1921.

Application filed January 17, 1919. Serial No. 271,566.

*To all whom it may concern:*

Be it known that I, JOHN C. HANKINS, a citizen of the United States, residing at Detroit, county of Wayne, State of Michigan, have invented a certain new and useful Improvement in Harness, and declare the following to be a full, clear, and exact description of the same, such as will enable others skilled in the art to which it pertains to make and use the same, reference being had to the accompanying drawings, which form a part of this specification.

My invention relates to harness and an object of my improvements is to provide an improved harness which will facilitate the hitching of the horse to the vehicle and by means of which the horse may be readily disconnected from the vehicle in case he should run away or become unmanageable.

I secure this object in the device illustrated in the accompanying drawings in which:

Figure 1 represents the thills of a vehicle and so much of the harness as is necessary to illustrate my invention.

Fig. 2 is a detail cross section in the plane 2—2 Fig. 1.

Fig. 3 is a detail cross section similar to Fig. 2 except that the parts are in the detaching position.

Fig. 4 is a detail elevation of the part of the harness which engages the thills.

Fig. 5 is a detail perspective view of one end of the whiffletrees, the tug or trace being shown in dotted lines.

Fig. 6 is a perspective view of the attaching fixture for the whiffletree.

Fig. 7 is a modified construction of the device shown in Fig. 6.

Fig. 8 is a modified construction of the attaching hook.

Fig. 9 is a detail plan view of the end of the whiffletree.

Fig. 10 is a sectional elevation showing a modified construction of the whiffletree end.

$a\ a$ are the thills and $a^2$ is the cross bar at the rear of the thills. $b$ is a strap extending across the back of the horse and down at the sides and continued in the girth $b^2$. $c$ is the breeching, $d$ is a hook having at its upper end a slot $d^2$ and at its rearward edge a slot $d^3$, said hook being turned up to form a flexible bill or tongue at $d^4$ at its lower end. One of these hooks $d$ engages each of the thills $a$, the tongue $d^4$ permitting the insertion of the thill from above or the threading of the hook over the thill. The breaching $c$ engages at each end in the slot $d^3$ at the side of the hook. The strap $b$ passes through the slot $d^2$ to secure the hook in place and is of less breadth than the length of said slot so that there shall be lost motion to obviate the bending of the hook or the shaft. $m\ m$ are lugs or stops fixed to the under surface of the thills against which the rear edges of the hooks $d$ engage in order to back the vehicle.

$h\ h^2\ h^3\ h^4$ is an attaching fixture consisting of the vertical portion $h$ bent backward and extending horizontally in the part $h^2$ then turned vertically downward in the part $h^3$, then extending forward in the part $h^4$. Said fixture is placed with the cross bar $a^2$ between its horizontal portions, as shown in Fig. 2, and is secured thereto by the pivoting bolt $i$. $h^5$ is a short stop-bar placed between the horizontal portions $h^2$ $h^4$ of the fixture and secured by rivets or bolts $h^6$ to the vertical portion $h^3$. The ends of the bar $h^5$ strike against the cross bar $a^2$ to limit the pivotal movement of said fixture. $j\ j^2$ is a piece L-shaped in cross section having the upper end of its vertical portion $j$ pivoted at $k$ to the upper end of the vertical portion $h$ of the attaching fixture. The whiffletree $f$ is bolted at $f^5$ to the portion $j^2$ of the L-shaped piece $j\ j^2$. Said whiffletree consists of a flat metal bar, the main portion of which is in a horizontal plane but it is twisted at each end, as shown most distinctly in Fig. 5, so that its extreme end is in an approximately vertical plane. There is an integral neck $f^2$ extending from each of the ends of the whiffletree $f$ intermediate the upper and lower edges at this point and enlarging into an approximately disk-shaped portion $f^4$. This construction leaves two shoulders $f^3\ f^3$ at the end of the whiffletree adjacent to the neck $f^2$. The neck $f^2$ should be bent until it carries the disk $f^4$ beyond the position at right angles to the whiffletree, as shown in Fig. 9. $e$ is a tug or trace and this is provided with the usual slots $e^2\ e^2$.

Instead of twisting and bending the parts $f^2\ f^4$ backward they may be bent directly upward as shown in Fig. 10, in which case a lug would be provided to prevent the trace from slipping down onto the whiffletree.

The mode of using the above described device is as follows:

The horse is placed between the thills, the latter passing into the bend of the hooks $d\ d$ either by being forced in from above or by the hooks being threaded over the thills from the end. The hooks engage against the stops $m\ m$, and the breaching being secured to said hooks the office of the holdback is secured thereby. The tugs, or traces, are attached to the whiffletree by turning slots $e^2$ to a vertical position, passing them over the disk $f^4$ and allowing them to return to their normal position, as shown in Figs. 2, 3 and 5. In this position they engage the neck $f^2$ and are prevented from lateral movement by the shoulders $f^3$ and enlargement $f^4$.

Should the horse run away or become unmanageable the part $j\ j^2$ is raised up turning about the pivot $k$ until the line of the tug which is normally below said pivot comes above the same, when the part $j\ j^2$ is caused to turn by the tension on the traces carrying the neck $f^2$ and enlargement through the slot $e^2$ as shown in Fig. 3, thus disengaging the tugs and the hooks $d$ slide off from the thills thus releasing the horse.

I plan to secure a chain to the outer end of the part $j^2$ of the piece $j\ j^2$ to facilitate the initial turning of said part about the pivot $k$ to release the tugs. To this end an aperture may be formed in the outer end of the part $j^2$, as shown in Fig. 6, or said part may be turned up to form hooks, as shown in Fig. 7. I plan also to use a spring $x$ to hold the part $j\ j^2$ in its normal position under usual conditions, as shown in Fig. 7.

Instead of securing the breaching to the slots or eyes on the inner edges of the hooks $d\ d$, I plan to bend the metal of the hook upon itself, as shown in Fig. 8 at $d\ a$, forming a downwardly and outwardly extending part and then boring a hole $d^{3a}$ through said part for the attachment of the breaching.

The ordinary thill-loops may evidently be used if desired in place of the hooks shown.

What I claim is:

1. In an apparatus of the kind described, a whiffletree consisting of a flat bar lying horizontal and adapted to turn about a pivot parallel to the length thereof, said bar being twisted to form vertical edges at its ends and being extended in a neck and an enlargement extending vertically in the normal position of the whiffletree.

2. In an apparatus of the kind described, an attaching piece consisting of two horizontal portions engaging a cross bar $a^2$ between them and being pivoted to said cross bar by a vertical bolt, said horizontal portions being joined by a vertical portion forming a loop at a distance from the edge of said cross bar, and a stop bar secured in said loop to said vertical portion for the purpose described.

3. In an apparatus of the kind described, a pivoted attaching piece consisting of the relatively vertical parts $h$ and $h^2$, a piece $j\ j^2$ having a vertical portion $j$ pivoted at its upper end to the vertical portion $h$ of the attaching piece, and a horizontal portion $j^2$ resting upon the horizontal portion $h^2$ of the attaching piece, and a whiffletree secured to the piece $j^2$ below said pivot.

4. In an apparatus of the kind described, a flat bar forming the whiffletree shaped to form a neck $f^2$ and a disk $f^4$ at its end bent at approximately right angles to the main portion of the whiffletree.

5. In an apparatus of the kind described, a pivoted attaching piece consisting of the relatively vertical parts $h$ and $h^2$, a piece $j\ j^2$ having a vertical portion $j$ pivoted at its upper end to the vertical portion $h$ of the attaching piece, and a horizontal portion $j^2$ resting upon the horizontal portion $h^2$ of the attaching piece, and a whiffletree secured to the piece $j\ j^2$ below said pivot, a pair of thills provided with lugs $m$ adapted to engage hooks on the harness.

In testimony whereof, I sign this specification.

JOHN C. HANKINS.